(12) United States Patent
Yang et al.

(10) Patent No.: US 7,573,251 B2
(45) Date of Patent: Aug. 11, 2009

(54) AC-TO-DC VOLTAGE REGULATOR

(75) Inventors: Ta-Yung Yang, Milpitas, CA (US);
Wei-Hsuan Huang, Taoyuan (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/477,484

(22) Filed: Jun. 30, 2006

(65) Prior Publication Data
US 2008/0001590 A1      Jan. 3, 2008

(51) Int. Cl.
*H02H 3/20* (2006.01)
*G05F 5/08* (2006.01)

(52) U.S. Cl. .................... 323/303; 323/276

(58) Field of Classification Search .......... 323/299, 323/303, 265, 266, 273, 274, 276, 282, 284; 327/108, 540; 363/59, 60; 361/18, 90, 91.1, 361/92
See application file for complete search history.

(56) References Cited

U.S. PATENT DOCUMENTS

| | | | | |
|---|---|---|---|---|
| 5,117,178 A | * | 5/1992 | Roth | 323/320 |
| 5,321,313 A | * | 6/1994 | Oberhauser | 327/432 |
| 7,088,083 B2 | * | 8/2006 | Ishii | 323/282 |
| 7,129,759 B2 | * | 10/2006 | Fukami | 327/110 |
| 7,219,022 B2 | * | 5/2007 | Wekhande | 702/58 |

\* cited by examiner

*Primary Examiner*—Gary L Laxton
(74) *Attorney, Agent, or Firm*—Rosenberg, Klein & Lee

(57) ABSTRACT

The present invention provides a high efficiency voltage regulator. It includes an input transistor coupled to a voltage source to provide a supply voltage. A detection circuit is coupled to the voltage source and the supply voltage to generate a control signal and an enable signal in response to voltage levels of the voltage source and the supply voltage. A charge pump circuit is coupled to the detection circuit and the input transistor to turn on the input transistor in response to the control signal. A control transistor is connected to the detection circuit and the input transistor to turn off the input transistor in response to the control signal.

20 Claims, 5 Drawing Sheets

AC-TO-DC VOLTAGE REGULATOR

BACKGROUND OF THE INVENTION

1. Field of the Invention

The present invention relates to a power converter. More particularly, the present invention relates to a voltage regulator.

2. Description of Related Art

FIG. 1 shows a traditional voltage regulator for supplying a regulated voltage $V_Z$ from a line voltage $V_{AC}$. A rectifier circuit 10 is coupled to the line voltage $V_{AC}$ and provides the rectification to generate an input voltage $V_{IN}$. A capacitor 11 is connected from the input voltage $V_{IN}$ to a capacitor 15 to produce the regulated voltage $V_Z$. A zener diode 16 is connected to the capacitor 15 for the regulation. A resistor 12 is used for the discharge of the capacitor 11. This type of the voltage regulator has been widely used in home appliances, such as coffee maker, cooling fan and remote controller, etc. However, the drawback of this type of the voltage regulator is high power consumption, particularly for light load and no load situations. Both the resistor 12 and the zener diode 16 cause significant power losses. Therefore, reducing the power loss for power saving is requirement. The object of present invention is to provide a high efficiency voltage regulator for both high load and light load conditions.

SUMMARY OF THE INVENTION

The present invention provides a voltage regulator includes an input transistor coupled to a voltage source to provide a supply voltage. A detection circuit is coupled to the voltage source and the supply voltage to generate a control signal and an enable signal in response to the voltage level of the voltage source and the voltage level of the supply voltage. A charge pump circuit is coupled to the detection circuit and the input transistor to turn on the input transistor in response to the control signal. A control transistor is connected to the detection circuit and the input transistor to turn off the input transistor in response to the control signal. The control signal of the detection circuit will disable the input transistor when the voltage level of the voltage source is higher than an input-over-voltage threshold and/or the voltage level of the supply voltage is higher than an output-over-voltage threshold. The enable signal of the detection circuit will turn off the output of the voltage regulator once the voltage level of the supply voltage is lower than an output-under-voltage threshold.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings.

DETAILED DESCRIPTION OF THE INVENTION

Figure 1:
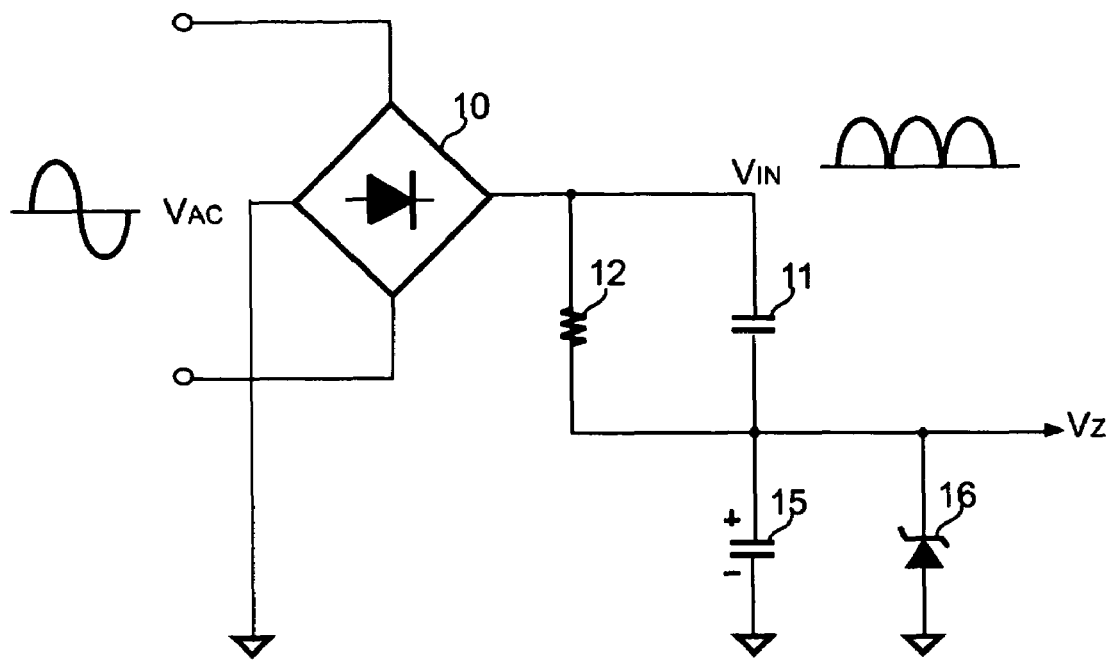
FIG. 1 shows a circuit diagram of a traditional voltage regulator.
Figure 2:
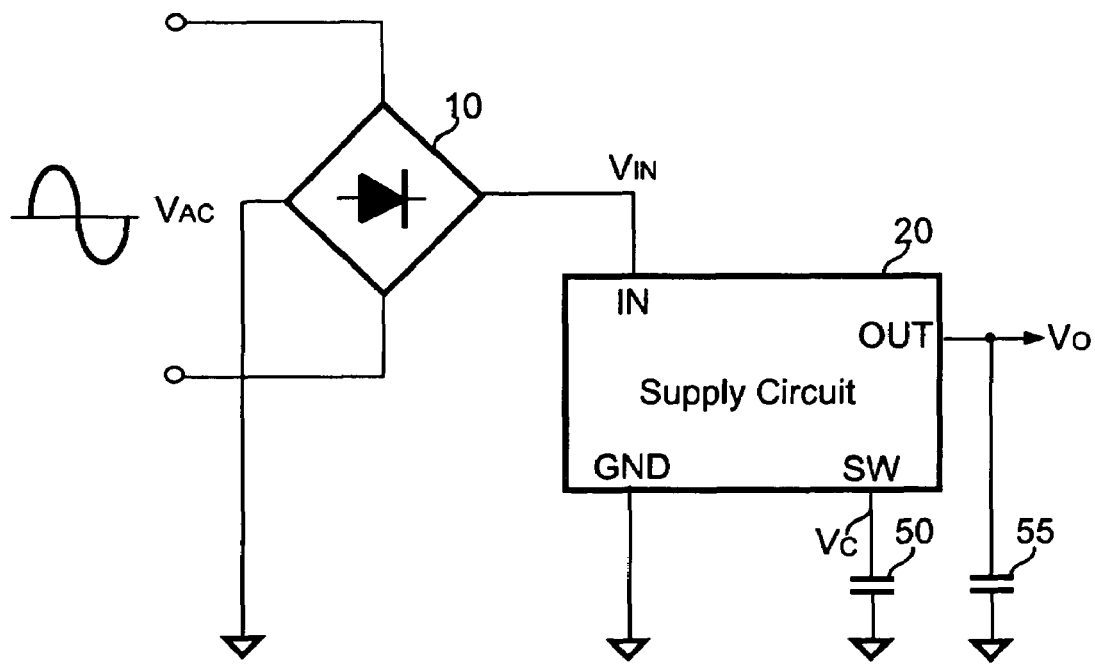
FIG. 2 shows a circuit diagram of a preferred embodiment of a voltage regulator according to the present invention.

FIG. 2 shows a circuit diagram of a voltage regulator according to the present invention. The rectifier circuit 10 receives the line voltage $V_{AC}$ to produce the input voltage $V_{IN}$ coupled to an input terminal IN of a supply circuit 20. The input voltage $V_{IN}$ is a voltage source and is rectified by the rectifier circuit 10. The supply circuit 20 will generate a supply voltage $V_C$ at a first output terminal SW, and generates an output voltage $V_O$ at a second output terminal OUT. A ground terminal GND of the supply circuit 20 is coupled to the ground. A capacitor 50 is connected to the first output terminal SW. Furthermore a capacitor 55 is connected to the second output terminal OUT for holding charge. The voltage regulator is also called a regulation circuit or a regulator.

Figure 3:
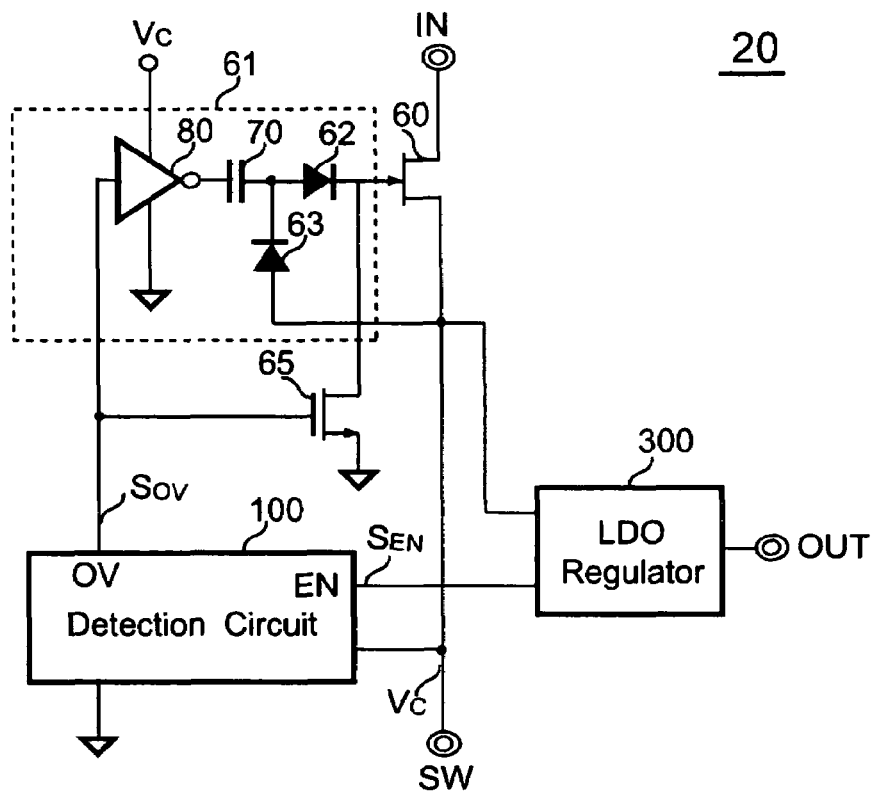
FIG. 3 shows a circuit diagram of a preferred embodiment of a supply circuit of the voltage regulator according to the present invention.

FIG. 3 is a circuit diagram of a preferred embodiment of the supply circuit 20 of the voltage regulator. The supply circuit 20 comprises an input transistor 60 coupled to the input terminal IN to receive the input voltage $V_{IN}$ for providing the supply voltage $V_C$ at the first output terminal SW. A detection circuit 100 is coupled to the first output terminal SW to detect the supply voltage $V_C$ for generating a control signal $S_{OV}$ at a control terminal OV of the detection circuit 100 in response to the voltage level of the supply voltage $V_C$.

A charge pump circuit 61 is coupled to the detection circuit 100 and the input transistor 60 to turn on the input transistor 60 in response to the control signal $S_{OV}$. The charge pump circuit 61 comprises an inverter buffer circuit 80 coupled to the detection circuit 100 to receive the control signal $S_{OV}$. A capacitor 70 is connected to the inverter buffer circuit 80. A second diode 63 is connected in between the capacitor 70 and the supply voltage $V_C$ to charge the capacitor 70 when the input transistor 60 is turned off. The voltage level of the capacitor 70 is charged up to the supply voltage $V_C$. A first diode 62 is coupled between the capacitor 70 and the input transistor 60 to turn on the input transistor 60 in response to the control signal $S_{OV}$.

When the inverter buffer circuit 80 outputs a logic high signal, the output voltage of the inverter buffer circuit 80 is equal to the voltage level of the supply voltage $V_C$. Therefore, the voltage applied to turn on the input transistor 60 is twice of the voltage level of the supply voltage $V_C$. The control signal $S_{OV}$ is coupled to switch off the input transistor 60 through a control transistor 65 when the supply voltage $V_C$ is higher than an output-over-voltage threshold. The control transistor 65 is coupled between the detection circuit 100 and the input transistor 60. A LDO (Low Drop-Out) regulator 300 is coupled to the supply voltage $V_C$ at the first output terminal SW to generate the output voltage $V_O$. The output voltage $V_O$ is coupled to the second output terminal OUT. Besides, the detection circuit 100 generates an enable signal $S_{EN}$ at an enable terminal EN of the detection circuit 100 in response to the voltage level of the supply voltage $V_C$. The enable signal $S_{EN}$ is connected to the LDO regulator 300 to switch off the output voltage $V_O$ of the supply circuit 20 when the voltage level of the supply voltage $V_C$ is lower than an output-under-voltage threshold.

Figure 4:
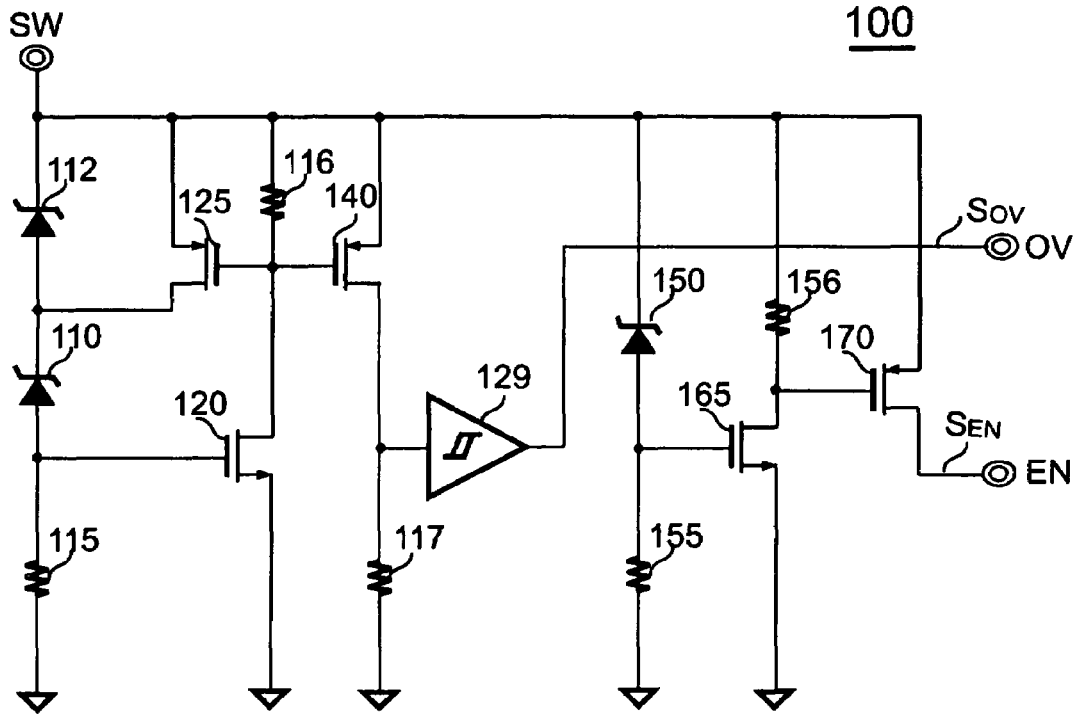
FIG. 4 shows a circuit diagram of a preferred embodiment of a detection circuit of the supply circuit according to the present invention.

FIG. 4 shows a circuit diagram of a preferred embodiment of the detection circuit 100. Zener diodes 110 and 112 are connected in serial. The zener diode 112 is further connected to the first output terminal SW to detect the supply voltage $V_C$. The zener diode 110 is connected to a resistor 115. The resistor 115 is further coupled to a transistor 120. The resistor 115 is used to turn on the transistor 120 when the voltage of the supply voltage $V_C$ is higher than the voltage of zener diodes 110 and 112. A transistor 125 is parallel connected with the zener diode 112 to short circuit the zener diode 112 when the transistor 120 is turned on, which achieve a hysteresis for detecting over-voltage of the supply voltage $V_C$. The zener voltage of the zener diodes 110 and 112 determines the output-over-voltage threshold.

A transistor 140 is coupled to the transistor 120 and the first output terminal SW. The transistor 140 is turned on in response to the turn-on of the transistor 120. A resistor 116 is coupled to the first output terminal SW, the transistors 125 and 140. The resistor 116 provides a bias to transistors 125 and 140. A resistor 117 is connected to the transistor 140 and a buffer circuit 129 to drive the buffer circuit 129 when the transistor 120 is turned on. The buffer circuit 129 is couple to the control transistor 65 of the supply circuit 20 and generates the control signal $S_{OV}$ to turn off the input transistor 60 of the supply circuit 20 once the voltage level of the supply voltage $V_C$ is higher than the output-over-voltage threshold.

A zener diode 150 is also connected to the first output terminal SW to detect the supply voltage $V_C$. A resistor 155 is connected to the zener diode 150 and a transistor 165 to turn on the transistor 165 once the supply voltage $V_C$ is higher than the output-under-voltage threshold. The zener voltage of the zener diode 150 determines the output-under-voltage threshold. A resistor 156 is coupled to the first output terminal SW and a transistor 170. The transistor 170 is further coupled to the first output terminal SW and the transistor 165. The transistor 170 generates the enable signal $S_{EN}$ when the voltage level of the supply voltage $V_C$ is lower than the output-under-voltage threshold.

Figure 5:
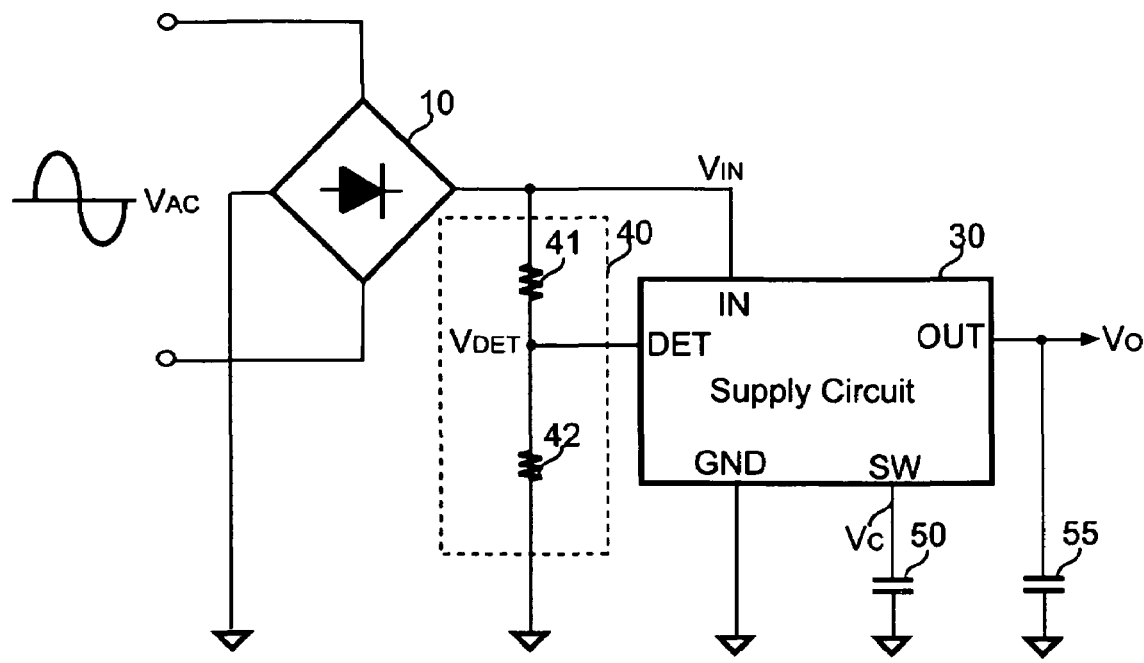
FIG. 5 shows a circuit diagram of another preferred embodiment of the voltage regulator according to the present invention.
Figure 6:
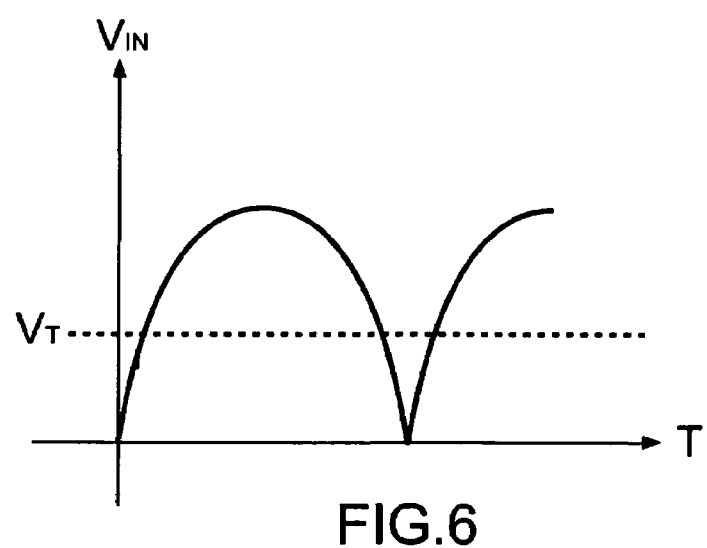
FIG. 6 shows the input voltage waveform of the voltage regulator shown in FIG. 5 according to the present invention.

FIG. 5 shows a circuit diagram of another preferred embodiment of the voltage regulator, in which the on/off of a supply circuit 30 is synchronized with the line voltage $V_{AC}$. The supply circuit 30 can only be switched on when the input voltage $V_{IN}$ is lower than an input-over-voltage threshold, which reduces the switching loss of the input transistor 60 and improves the efficiency of the voltage regulator. FIG. 6 shows the waveform of the input voltage $V_{IN}$, in which the power of the input voltage $V_{IN}$ can be delivered to the first output terminal SW when the input voltage $V_{IN}$ is lower than a threshold voltage $V_T$. The threshold voltage $V_T$ is correlated to the input-over-voltage threshold. The supply circuit 30 includes a detection terminal DET coupled to the input voltage $V_{IN}$ through a voltage divider 40. The voltage divider 40 is coupled to the input voltage $V_{IN}$ and the detection terminal DET. The voltage divider 40 comprises resistors 41 and 42. The resistors 41 and 42 are coupled in series. The resistors 41 and 42 determine the input-over-voltage threshold.

Figure 7:
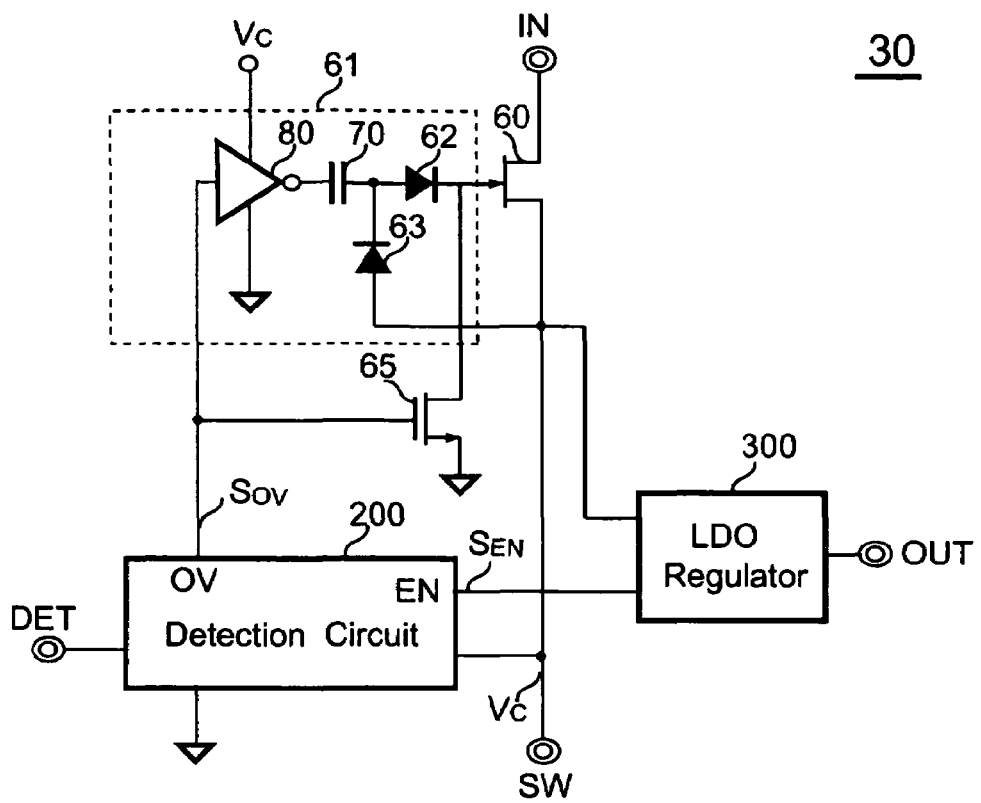
FIG. 7 shows a circuit diagram of a preferred embodiment of the supply circuit of the voltage regulator shown in FIG. 5 according to the present invention.

FIG. 7 shows a preferred embodiment of the supply circuit 30 of the voltage regulator shown in FIG. 5. The supply circuit 30 comprises the input transistor 60 coupled to the input terminal IN to receive the input voltage $V_{IN}$ for providing the supply voltage $V_C$ at the first output terminal SW. The input voltage $V_{IN}$ is the voltage source. A detection circuit 200 is coupled to the first output terminal SW and the detection terminal DET to generate the control signal $S_{OV}$ at the control terminal OV. The control signal $S_{OV}$ is produced in response to a voltage $V_{DET}$ of the detection terminal DET and the voltage level of the supply voltage $V_C$. The voltage $V_{DET}$ of the detection terminal DET is correlated to the input voltage $V_{IN}$. The charge pump circuit 61 is coupled to the detection circuit 200 and the input transistor 60 to turn on the input transistor 60 in response to the control signal $S_{OV}$.

The charge pump circuit 61 comprises the inverter buffer circuit 80 coupled to the detection circuit 200 to receive the control signal $S_{OV}$. The capacitor 70 is connected to the inverter buffer circuit 80. The second diode 63 is connected in between the capacitor 70 and the supply voltage $V_C$ to charge the capacitor 70 when the input transistor 60 is turned off. The voltage level of the capacitor 70 is charged up to the supply voltage $V_C$. The first diode 62 is coupled to the capacitor 70 and the input transistor 60 to turn on the input transistor 60 in response to the control signal $S_{OV}$. When the inverter buffer circuit 80 outputs the logic high signal, the output voltage of the inverter buffer circuit 80 is equal to the voltage level of the supply voltage $V_C$. Therefore, the voltage applied to turn on the input transistor 60 is twice of the voltage level of the supply voltage $V_C$. The control signal $S_{OV}$ is coupled to switch off the input transistor 60 through the control transistor 65 when the voltage level of the supply voltage $V_C$ is higher than the output-over-voltage threshold and/or the voltage level of the input voltage $V_{IN}$ is higher than the input-over-voltage threshold.

The LDO regulator 300 is coupled to the first output terminal SW to receive the supply voltage $V_C$ for generating the output voltage $V_O$. The output voltage $V_O$ is coupled to the second output terminal OUT. Besides, the detection circuit 200 generates the enable signal $S_{EN}$ at the enable terminal EN of the detection circuit 200 in response to the voltage level of the supply voltage $V_C$. The enable signal $S_{EN}$ is connected to the LDO regulator 300 to switch off the output voltage $V_O$ of the supply circuit 30 when the voltage level of the supply voltage $V_C$ is lower than the output-under-voltage threshold.

Figure 8:
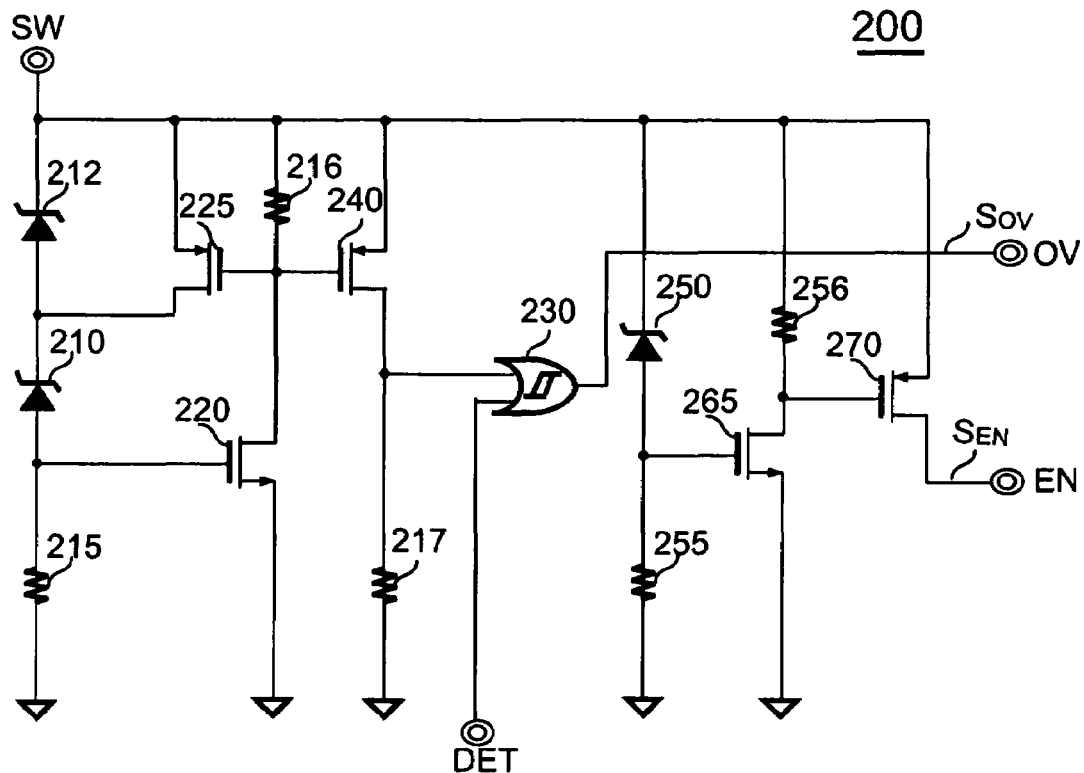
FIG. 8 shows a circuit diagram of a preferred embodiment of the detection circuit of the supply circuit shown in FIG. 7 according to the present invention.

FIG. 8 is a circuit diagram of a preferred embodiment of the detection circuit 200. Zener diodes 210 and 212 are connected in serial. The zener diode 212 is further connected to the first output terminal SW to detect the supply voltage $V_C$. The zener diode 210 is connected to a resistor 215. The resistor 215 is further coupled to a transistor 220. The resistor 215 is used to turn on the transistor 220 when the voltage of the supply voltage $V_C$ is higher than the voltage of the zener diodes 210 and 212. A transistor 225 is parallel connected with the zener diode 212 to short circuit the zener diode 212 when the transistor 220 is turned on, which achieve the hysteresis for detecting over-voltage of the supply voltage $V_C$. The zener voltage of the zener diodes 210 and 212 determines the output-over-voltage threshold.

A transistor 240 is coupled to the transistor 220 and the first output terminal SW. The transistor 240 is turned on in response to the turn-on of the transistor 220. A resistor 216 is coupled to the first output terminal SW, the transistors 225 and 240. The resistor 216 provides a bias to the transistors 225 and 240. A resistor 217 is connected to the transistor 240 and an input terminal of an OR-gate buffer circuit 230 to drive the OR-gate buffer circuit 230 when the transistor 220 is turned on. Another input terminal of the OR-gate buffer circuit 230 is connected to the detection terminal DET of the detection circuit 200. An output terminal of the OR-gate buffer circuit 230 is couple to the control transistor 65 of the supply circuit 30 and generates the control signal $S_{OV}$ to turn off the input transistor 60 of the supply circuit 30 when the voltage level of the supply voltage $V_C$ is higher than the output-over-voltage threshold and/or the voltage level of the input voltage $V_{IN}$ is higher than the input-over-voltage threshold.

A zener diode 250 is also connected to the first output terminal SW to detect the supply voltage $V_C$. A resistor 255 is connected to the zener diode 250 and a transistor 265 to turn on the transistor 265 once the supply voltage $V_C$ is higher than the output-under-voltage threshold. The zener voltage of the zener diode 250 determines the output-under-voltage threshold. A resistor 256 is coupled to the first output terminal SW and a transistor 270. The transistor 270 is further coupled to the first output terminal SW and the transistor 265. The transistor 270 generates the enable signal $S_{EN}$ when the voltage level of the supply voltage $V_C$ is lower than the output-under-voltage threshold.

Figure 9:
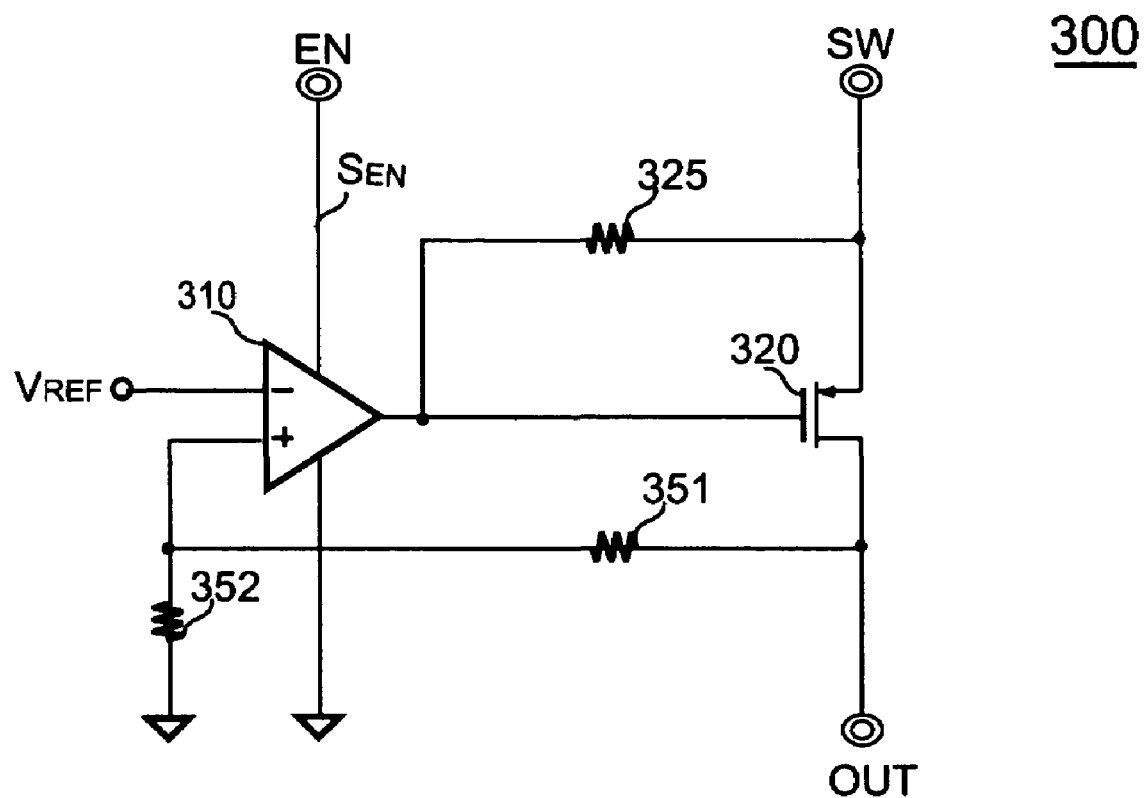
FIG. 9 shows a circuit diagram of a preferred embodiment of a LDO regulator of the supply circuit according to the present invention.

FIG. 9 shows a circuit diagram of the LDO regulator 300 that includes an operational amplifier 310, a pass element 320 and resistors 325, 351, 352. The operational amplifier 310 includes a reference voltage $V_{REF}$ coupled to a negative input terminal of the operational amplifier 310. The resistor 352 is coupled to a positive input terminal of the operational amplifier 310. The enable signal $S_{EN}$ is coupled to the operational amplifier 310 to provide a power source for operating the operational amplifier 310. The pass element 320 is coupled to the operational amplifier 310, the first output terminal SW and the second output terminal OUT. The operational amplifier 310 and the pass element 320 are disabled once the enable signal $S_{EN}$ is disabled. The resistor 351 is coupled to the positive input terminal of the operational amplifier 310 and the pass element 320. The resistor 325 is coupled to the pass element 320. The pass element 320 could be a transistor.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A voltage regulator comprising:
   an input transistor coupled to a voltage source to provide a supply voltage;
   a detection circuit coupled to the voltage source and the supply voltage to generate a control signal and an enable signal in response to the voltage level of the voltage source and the voltage level of the supply voltage;
   a charge pump circuit coupled to the detection circuit and the input transistor to turn on the input transistor in response to the control signal; and
   a control transistor coupled to the detection circuit and the input transistor to turn off the input transistor in response to the control signal;
   wherein the enable signal is utilized to turn on/off the output of the voltage regulator.

2. The voltage regulator as claimed in claim 1, wherein the control signal of the detection circuit will disable the input transistor once the voltage level of the voltage source is higher than an input-over-voltage threshold.

3. The voltage regulator as claimed in claim 1, wherein the control signal of the detection circuit will disable the input transistor once the voltage level of the supply voltage is higher than an output-over-voltage threshold.

4. The voltage regulator as claimed in claim 1, where in the enable signal of the detection circuit will turn off the output of the voltage regulator once the voltage level of the supply voltage is lower than an output-under-voltage threshold.

5. The voltage regulator as claimed in claim 1, wherein the detection circuit is coupled to the voltage source through a voltage divider.

6. The voltage regulator as claimed in claim 1, wherein the charge pump circuit comprises:
   an inverter buffer circuit coupled to the control signal;
   a capacitor connected to the inverter buffer circuit;
   a first diode coupled to the capacitor and the input transistor to turn on the input transistor in response to the control signal; and
   a second diode coupled to the capacitor and the supply voltage to charge the capacitor when the input transistor is turned off.

7. A regulator comprising:
   an input transistor coupled to a voltage source to provide a supply voltage;
   a detection circuit coupled to the supply voltage to generate a control signal in response to the voltage level of the supply voltage;
   a charge pump circuit connected to the detection circuit and the input transistor, the charge pump circuit receiving the control signal and controlled by the detection circuit to turn on the input transistor in response to the control signal; and
   a control transistor coupled to the detection circuit and the input transistor to turn off the input transistor in response to the control signal.

8. The regulator as claimed in claim 7, wherein the detection circuit further generates an enable signal in response to the voltage level of the supply voltage, the enable signal is utilized to turn on/off the output of the regulator.

9. The regulator as claimed in claim 8, wherein the enable signal of the detection circuit will turn off the output of the regulator once the voltage level of the supply voltage is lower than an output-under-voltage threshold.

10. The regulator as claimed in claim 7, wherein the control signal of the detection circuit will disable the input transistor once the voltage level of the supply voltage is higher than an output-over-voltage threshold.

11. The regulator as claimed in claim 7, wherein the charge pump circuit comprises:
    an inverter buffer circuit coupled to the control signal;
    a capacitor connected to the inverter buffer circuit;
    a first diode coupled to the capacitor and the input transistor to turn on the input transistor in response to the control signal; and
    a second diode coupled to the capacitor and the supply voltage to charge the capacitor when the input transistor is turned off.

12. A regulation circuit comprising:
    an input transistor coupled to a voltage source to provide a supply voltage;
    a detection circuit coupled to the voltage source to generate a control signal in response to the voltage level of the voltage source;
    a charge pump circuit connected to the detection circuit and the input transistor, the charge pump circuit receiving the control signal and controlled by the detection circuit to turn on the input transistor in response to the control signal; and
    a control transistor coupled to the detection circuit and the input transistor to turn off the input transistor in response to the control signal.

13. The regulation circuit as claimed in claim 12, wherein the control signal of the detection circuit will disable the input transistor once the voltage level of the voltage source is higher than an input-over-voltage threshold.

14. The regulation circuit as claimed in claim 12, wherein the detection circuit is coupled to the voltage source through a voltage divider.

15. The regulation circuit as claimed in claim 12, wherein the charge pump circuit comprises:
   an inverter buffer circuit coupled to the control signal;
   a capacitor connected to the inverter buffer circuit;
   a first diode coupled to the capacitor and the input transistor to turn on the input transistor in response to the control signal; and
   a second diode coupled to the capacitor and the supply voltage to charge the capacitor when the input transistor is turned off.

16. A voltage regulator comprising:
   an input transistor providing a supply voltage in response to a voltage source;
   a detection circuit generating a control signal and an enable signal in response to the voltage level of the voltage source and the voltage level of the supply voltage;
   a charge pump circuit turning on the input transistor in response to the control signal; and
   a control transistor turning off the input transistor in response to the control signal;
   wherein the enable signal is utilized to turn on/off the output of the voltage regulator.

17. The voltage regulator as claimed in claim 16, wherein the control signal of the detection circuit will disable the input transistor once the voltage level of the supply voltage is higher than an output-over-voltage threshold.

18. A regulator comprising:
   an input transistor providing a supply voltage in response to a voltage source;
   a detection circuit generating a control signal in response to the voltage level of the supply voltage;
   a charge pump circuit connected to the detection circuit, the charge pump circuit receiving the control signal and controlled by the detection circuit to turn on the input transistor in response to the control signal; and
   a control transistor coupled to turn off the input transistor in response to the control signal.

19. The regulator as claimed in claim 18, wherein the detection circuit further generates an enable signal in response to the voltage level of the supply voltage, the enable signal will turn off the output of the regulator once the voltage level of the supply voltage is lower than an output-under-voltage threshold.

20. A regulation circuit comprising:
   an input transistor providing a supply voltage in response to a voltage source;
   a detection circuit generating a control signal in response to the voltage level of the voltage source;
   a charge pump circuit connected to the detection circuit, the charge pump circuit receiving the control signal and controlled by the detection circuit to turn on the input transistor in response to the control signal; and
   a control transistor coupled to turn off the input transistor in response to the control signal.

* * * * *